(12) United States Patent
Chang

(10) Patent No.: US 8,851,585 B2
(45) Date of Patent: Oct. 7, 2014

(54) STRUCTURE OF A TOOL CABINET

(71) Applicant: Ting-Yu Chang, Taichung (TW)

(72) Inventor: Ting-Yu Chang, Taichung (TW)

( * ) Notice: Subject to any disclaimer, the term of this patent is extended or adjusted under 35 U.S.C. 154(b) by 46 days.

(21) Appl. No.: 13/778,706

(22) Filed: Feb. 27, 2013

(65) Prior Publication Data

US 2013/0221820 A1 Aug. 29, 2013

(30) Foreign Application Priority Data

Feb. 29, 2012 (TW) .............................. 101203552 A

(51) Int. Cl.
*A47B 47/00* (2006.01)
*B25H 3/02* (2006.01)
*A47B 81/00* (2006.01)
*B62B 3/00* (2006.01)
*A47B 67/04* (2006.01)

(52) U.S. Cl.
CPC ............... *B25H 3/02* (2013.01); *B62B 2202/48* (2013.01); *B62B 3/003* (2013.01); *A47B 81/00* (2013.01); *B62B 3/005* (2013.01); *A47B 67/04* (2013.01); *B62B 2501/00* (2013.01); *B62B 3/004* (2013.01); *Y10S 312/902* (2013.01)
USPC .......................... 312/263; 312/257.1; 312/902

(58) Field of Classification Search
CPC ...................................................... A47B 67/04
USPC ................ 312/294, 257.1, 263, 265.1, 265.3, 312/265.4, 902, 249.1, 249.8, 249.11; 280/47.34, 47.35, 79.3
See application file for complete search history.

(56) References Cited

U.S. PATENT DOCUMENTS

| | | | | |
|---|---|---|---|---|
| 3,520,583 A | * | 7/1970 | Case | 312/277 |
| 5,246,286 A | * | 9/1993 | Huebschen et al. | 312/263 |
| 5,294,196 A | * | 3/1994 | Chen | 312/263 |
| 5,645,332 A | * | 7/1997 | Snoke et al. | 312/257.1 |
| D672,575 S | * | 12/2012 | Christopher | D6/671.1 |
| 2003/0201699 A1 | * | 10/2003 | Hong et al. | 312/290 |
| 2006/0145574 A1 | * | 7/2006 | Hung | 312/249.11 |
| 2008/0012455 A1 | * | 1/2008 | Zheng | 312/262 |
| 2008/0129165 A1 | * | 6/2008 | Chen et al. | 312/263 |
| 2010/0314978 A1 | * | 12/2010 | Manalang et al. | 312/243 |

* cited by examiner

*Primary Examiner* — James O Hansen
(74) *Attorney, Agent, or Firm* — Muncy, Geissler, Olds & Lowe, P.C.

(57) ABSTRACT

A tool cabinet structure has four columns standing on four corners of a platform. The top of each of the columns has a covering part and a support part. A cover board rests on four support parts at the tops of the four columns and is restricted by four covering parts. Two sideboards and one backboard are fixed to the sides of the platform to form an accommodating space. Several drawers are inserted into the accommodating space in a sliding way.

2 Claims, 9 Drawing Sheets

STRUCTURE OF A TOOL CABINET

BACKGROUND OF THE INVENTION

1. Field of Invention

The invention relates to a tool cabinet and the structure thereof. In particular, the invention relates to a tool cabinet with good strength and stability in the structure thereof.

2. Related Art

As shown in FIG. 7, a conventional tool cabinet and the assembly structure thereof contains one rectangular platform 90, two sideboards 91, one back board (not shown), one cover board 93 and several drawers 94. The two sideboards 91 are on both sides of the platform 90. The backboard is located on the back side of the platform 90. The front side thereof is an open side. The two sideboards 91 and the backboard are connected with the top edges at equal height in a straight way. As shown in FIG. 8, the cover plate 93 also has a rectangular shape. Each side thereof is provided with undercut-shaped eaves 930 corresponding to the two sideboards 91 and the backboard. The cover board 93 is then disposed on the top edges of the two sideboards 91 and the backboard using the eaves 930. Therefore, an accommodating space is formed on the platform 90 by the two sideboards 91, the backboard, and the cover board 93 for the drawers 94 to be inserted from the open side.

However, such tool cabinets are usually used in the work environments of manufacturing plants and maintenance plants. The user may place tools on the cover board 93 of the tool cabinet while working. Due to the extra weight, the eaves 930 of the cover board 93 deform and bend upwards, as shown in FIG. 9. The positioning of the cover board 93 on the two sideboards 91 and the backboard cover 93 will become increasingly unstable with bending eaves 930.

SUMMARY OF THE INVENTION

A primary objective of the invention is to provide a tool cabinet assembly structure to solve the above-mentioned problems. Even if loaded with weight, the cover board can also be securely fixed and positioned on the tool cabinet. The entire structure of the tool cabinet has good strength and stability.

To achieve the aforementioned objective, the invention comprises: one platform, four columns, one cover board, two sideboards, and one backboard.

The platform has a rectangular shape with four right-angled corners.

The four columns stand respectively at the four corners of the platform. The top of each of the four columns has a covering part and a support part. Each covering part bends along the right angle of the corresponding corner. Each support part is on the inner side relative to the corresponding column, and adjacent to the corresponding covering part. The covering parts of the four columns are higher than the support parts. The four covering parts and the four support parts enclose a disposition space at the top of the four columns.

The cover board has a rectangular shape with four right-angled corners. The bottom thereof rests on the four supports parts within the accommodating space. The four corners thereof are blocked by the corresponding covering parts.

The two sideboards are vertically disposed on two opposite sides of the platform. Both ends of each of the sideboards are respectively fixed to one of the columns.

The backboard is vertically disposed on the side of the platform different from the two sideboards. Both ends of the backboard are respectively fixed to one of the columns.

The platform, the two sideboards, the backboard, and the cover board enclose an accommodating space. The side opposite to the backboard is the opening of the accommodating space. Several drawers can be inserted into the accommodating space in a sliding way.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Please refer to FIGS. 1 to 5. The drawings show a preferred embodiment of the invention. This embodiment is for illustrative purposes only, and should not be used to restrict the scope of the claims.

Figure 1:
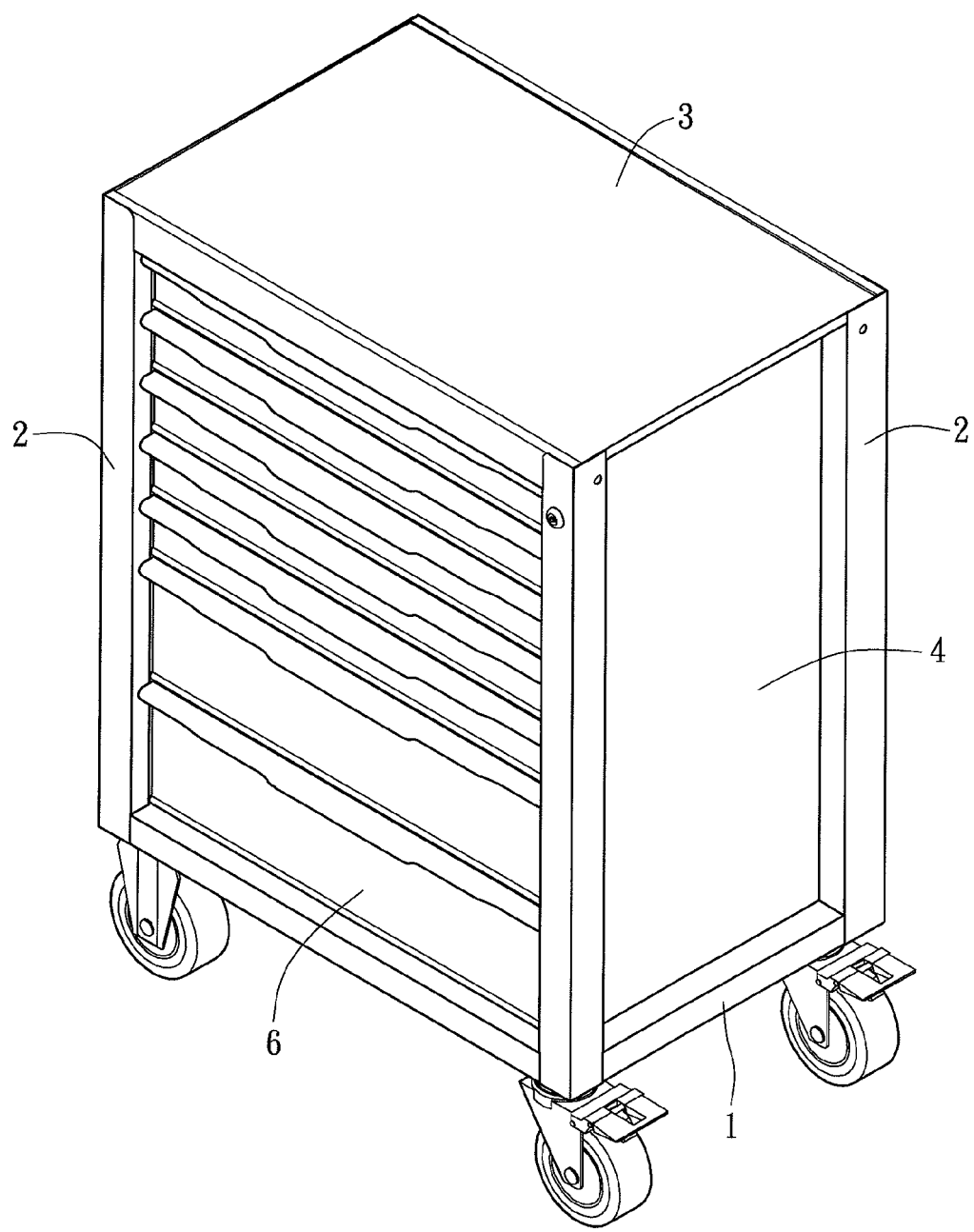
FIG. 1 is a three-dimensional perspective view of the first embodiment of the invention.
Figure 2:
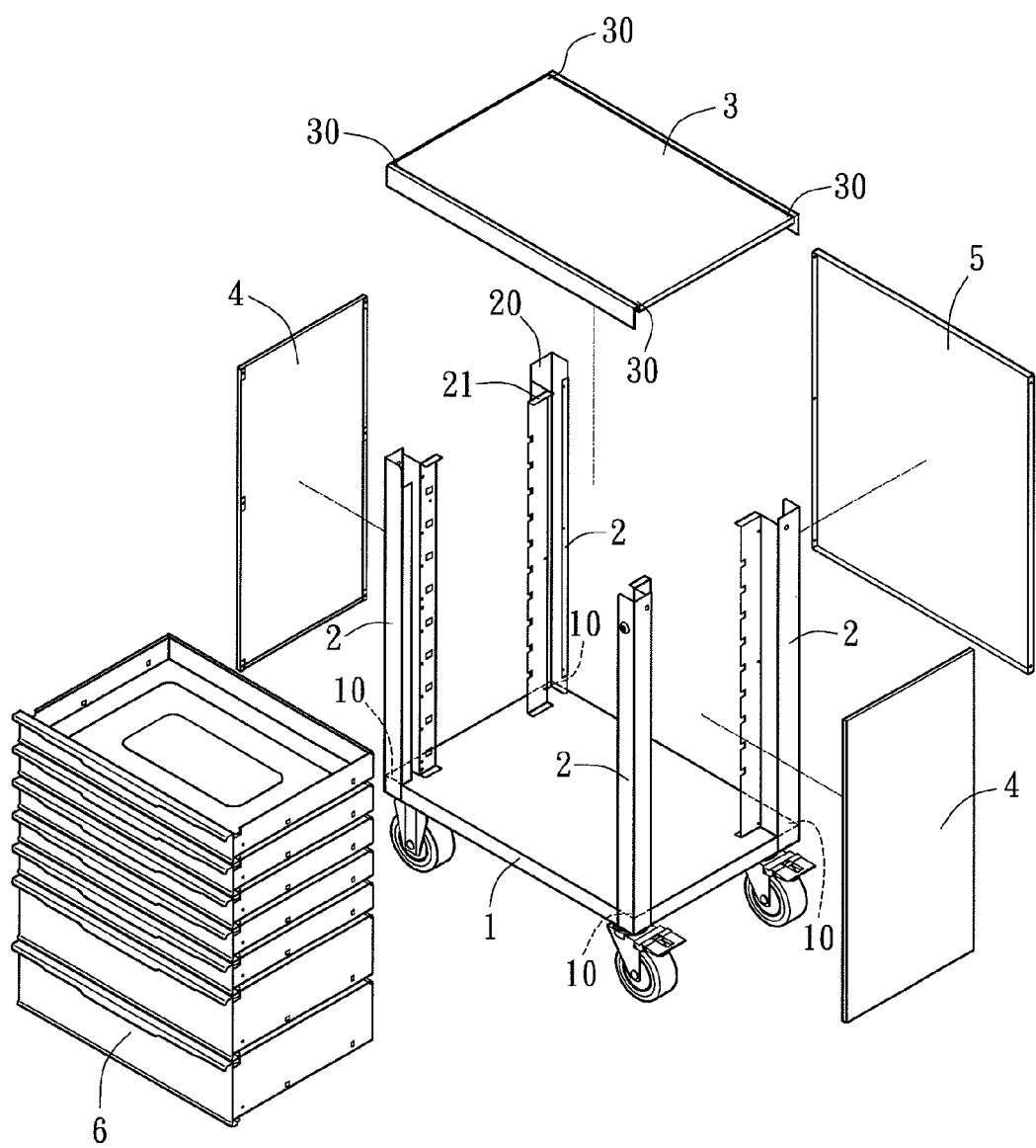
FIG. 2 is a three-dimensional exploded view of the first embodiment.

This embodiment provides a tool cabinet assembly structure, as shown in FIGS. 1 and 2. It comprises one platform 1, four columns 2, one cover board 3, two sideboards 4, and one backboard 5, and a plurality of drawers 6.

As shown in FIG. 2, the platform 1 of this embodiment has a rectangular shape with four right-angled corners 10.

As shown in FIG. 2, the four columns 2 stand respectively on the four corners 10 of the platform 1. The top of each of the four columns 2 has a covering part 20 and a support part 21. Each covering part 20 bends along the corresponding right-angled corner 10. Each support part 21 is on the inner side of the platform 1 relative to the column 2 and is adjacent to the covering part 20. The covering parts 20 of the four columns 2 are higher than the support parts 21. The four covering parts 20 and the four support parts 21 at the tops of the four columns 2 enclose a disposition space 70.

Figure 3:
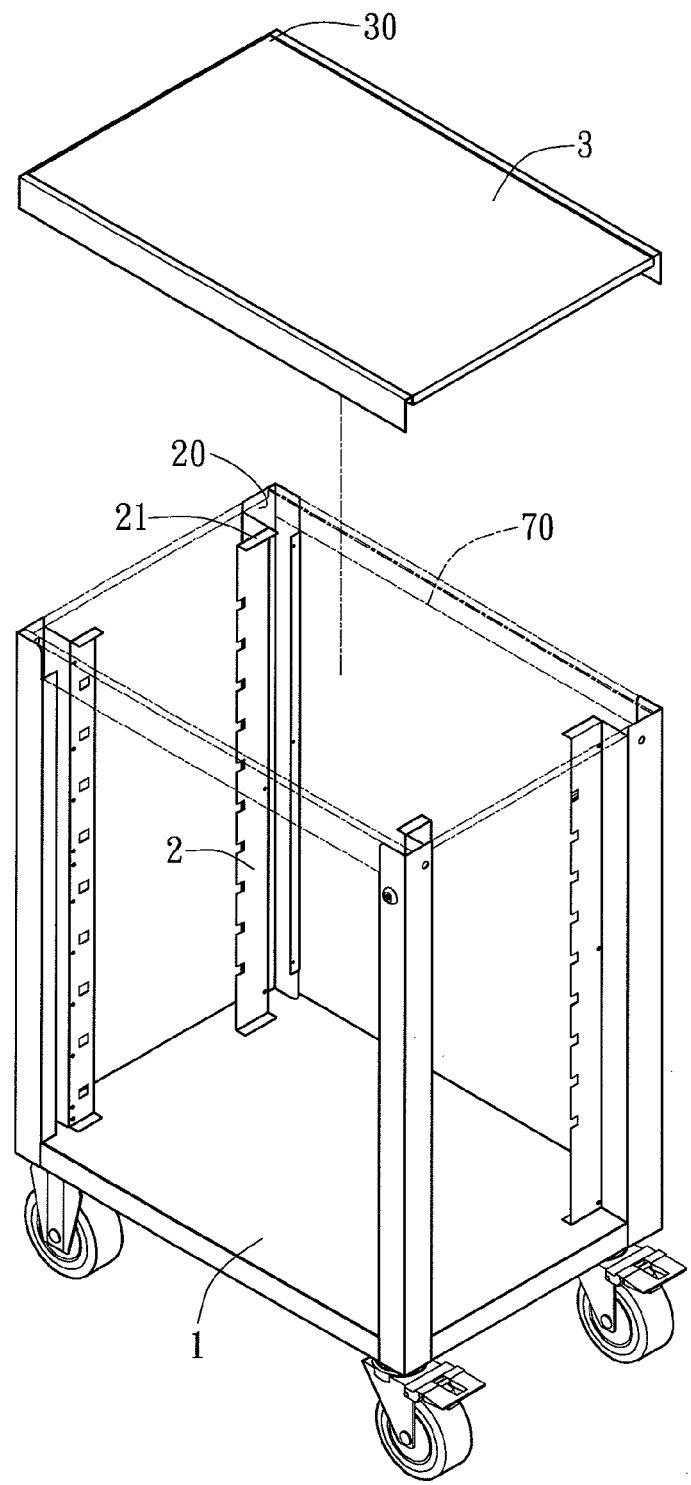
FIG. 3 is a schematic view of disposing the cover board on the tops of the four columns in the first embodiment.

As FIGS. 2 and 3 shows, the cover board 3 has a rectangular shape with four right-angled corners 30. The cover board 3 can be accommodated within the disposition space 70. The bottom of the cover board 3 rests on the four support parts 21. The four corners 30 of the cover board 3 are respectively blocked by the corresponding covering parts 20.

Figure 4:
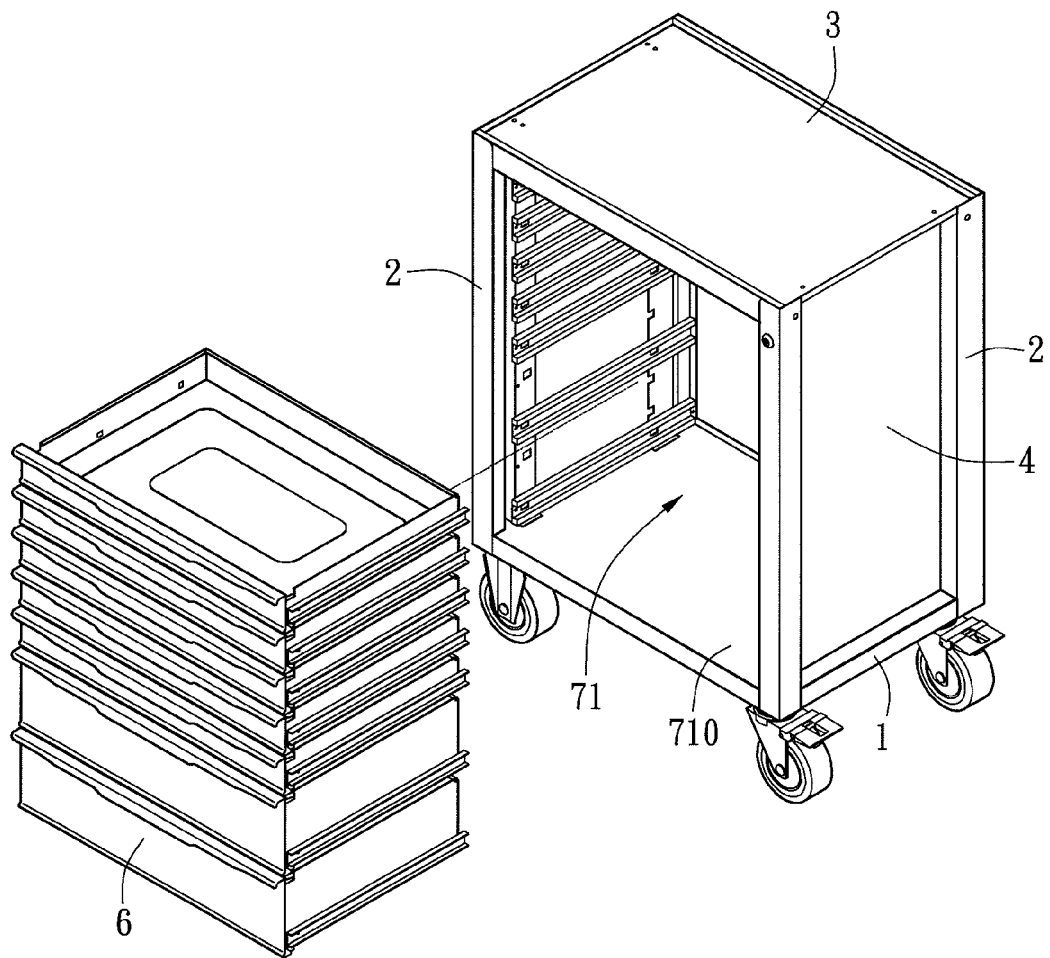
FIG. 4 is a locally enlarged view of how the support parts at the tops of the columns support the cover board.
Figure 5:
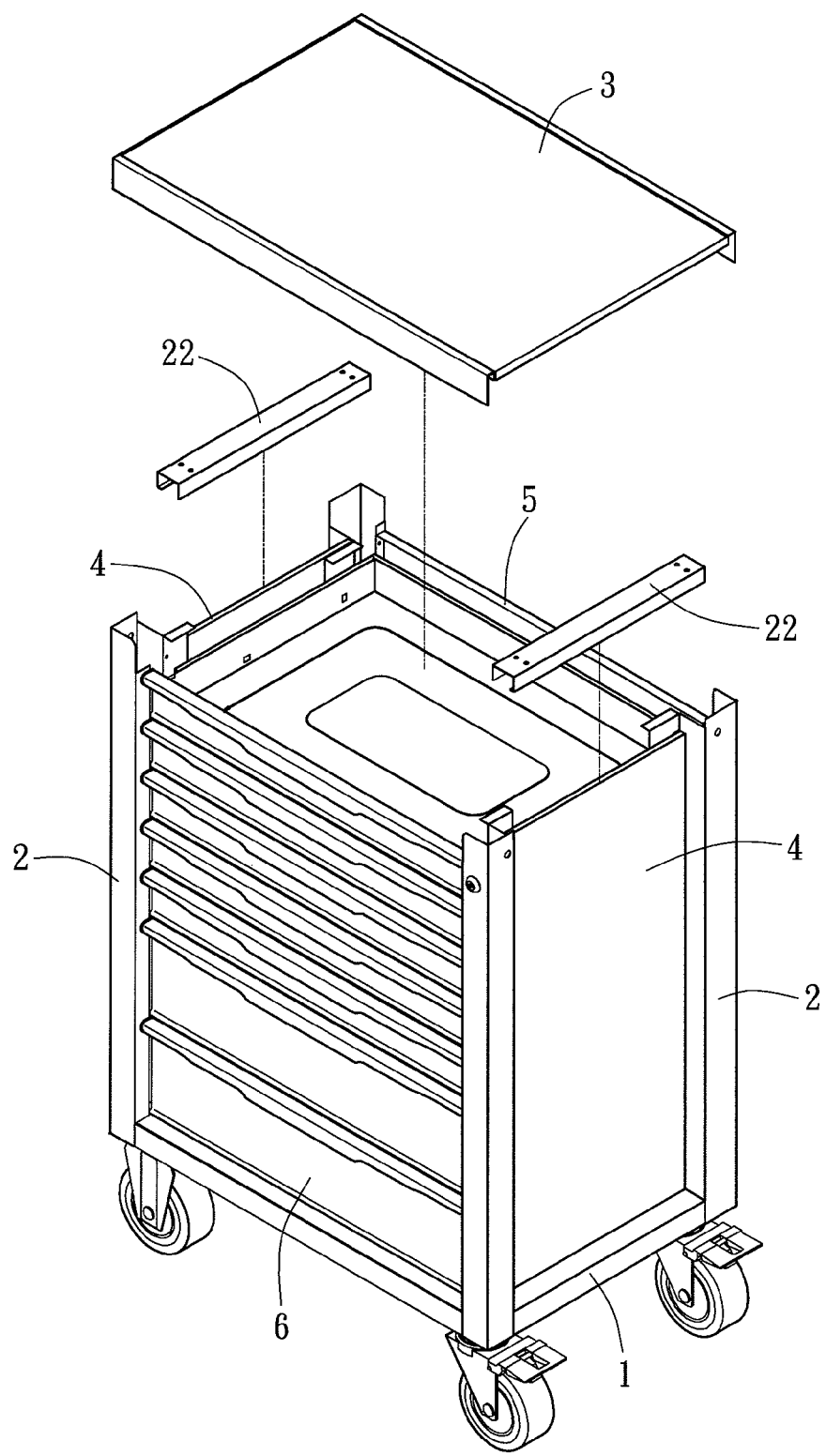
FIG. 5 is a three-dimensional view of a locally exploded part.

Please refer to FIGS. 1, 2 and 4. Two opposite sides of the platform 1 are vertically disposed with a sideboard 4. Both ends of each of the sideboards 4 are respectively fixed to one of the columns 2. In this embodiment, each sideboard 4 is fixed to the outer side of the corresponding columns 2.

Please refer to FIGS. 1, 2 and 4 again. The backboard 5 is vertically disposed on the platform 1, on a side that is different from the sides of the two sideboards 4. Both ends of the backboard 5 are respectively fixed to one of the columns 2. The backboard 5 in this embodiment is also fixed to the outer side of the corresponding columns 2.

As shown in the FIG. 4, the platform 1, the cover board 3, the two sideboards 4, and the backboard 5 enclose an accommodating space 71. The side opposite to the backboard 5 becomes the opening 710 of the accommodating space 71. Several drawers 6 are inserted into the accommodating space 71 via the opening 710 in a sliding way.

It is not difficult to find from the above description the advantages of the present invention. The disposition space 70 enclosed by the covering parts 20 at the tops of the four columns 2 can accommodate the cover board. The support parts 21 support the cover board 3. The covering parts 20 block the four corners 30 of the cover board 3. In this case, the four support parts 21 firmly support the cover board 3 on the columns 2. Thus, the cover board 3 receives the support with a good structural strength. The covering parts 20 restrict the cover board 3 to the tops of the four columns 2, so that the cover board 3 is not allowed to have any lateral displacement. Even if it is loaded with a weight, the cover board 3 is still firmly positioned at the tops of the four columns. In comparison with the conventional tool cabinet assembly structure, the invention has a better structure in strength, rendering better overall stability.

Figure 6:
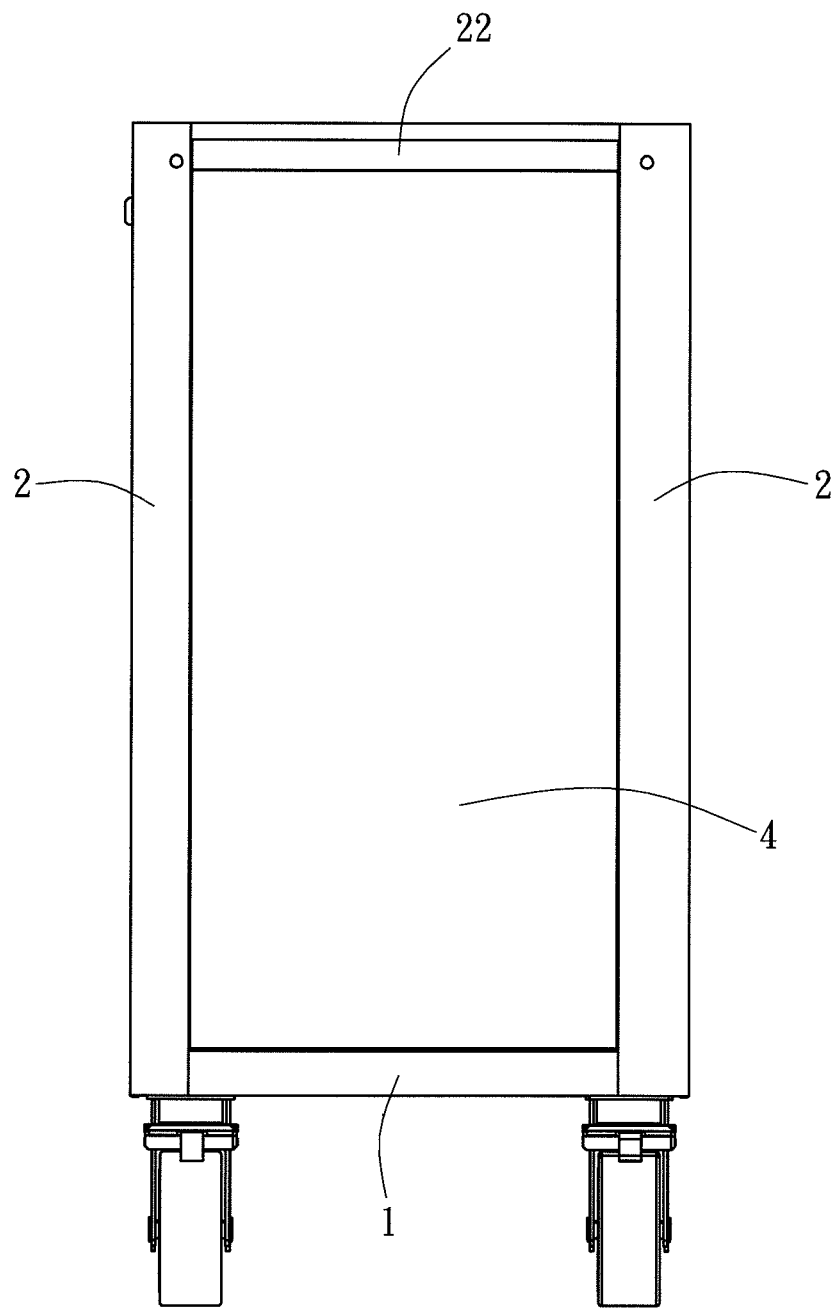
FIG. 6 is a schematic view showing the support of a cross-bar between two columns.
Figure 7:
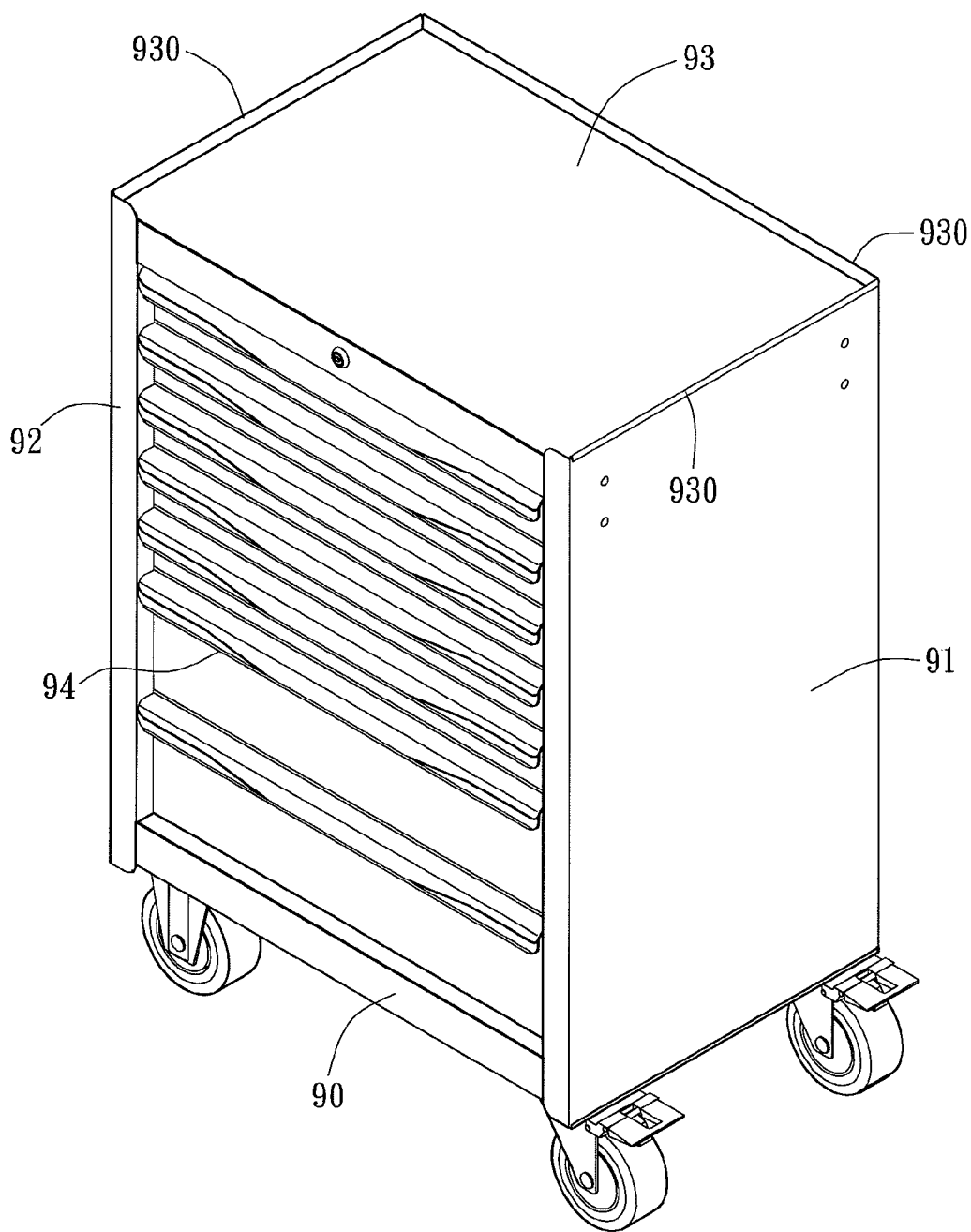
FIG. 7 is a three-dimensional assembly view of a conventional tool cabinet.
Figure 8:
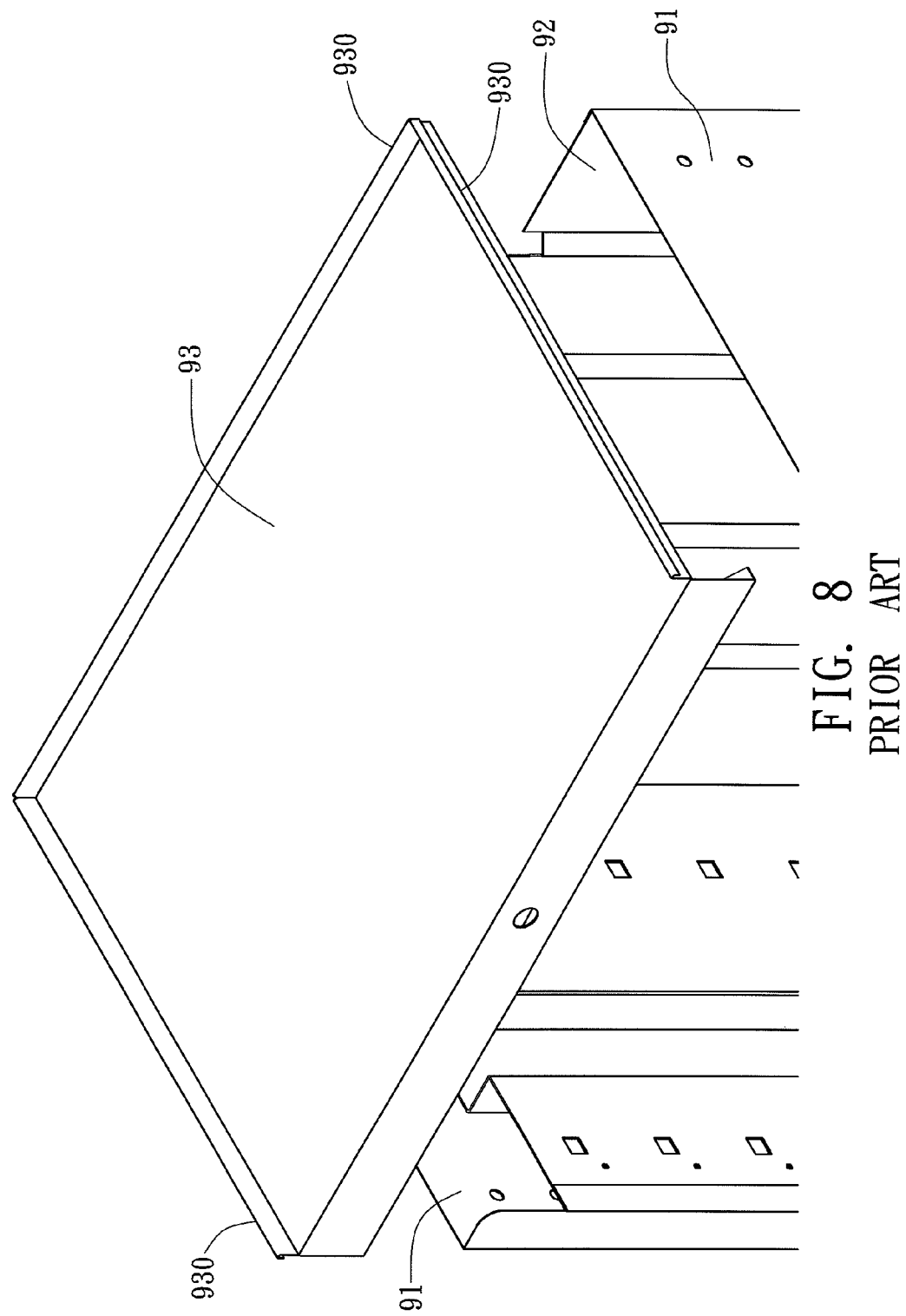
FIG. 8 is a schematic three-dimensional view of the cover board mounting on the sideboards and the backboard in a conventional tool cabinet.
Figure 9:
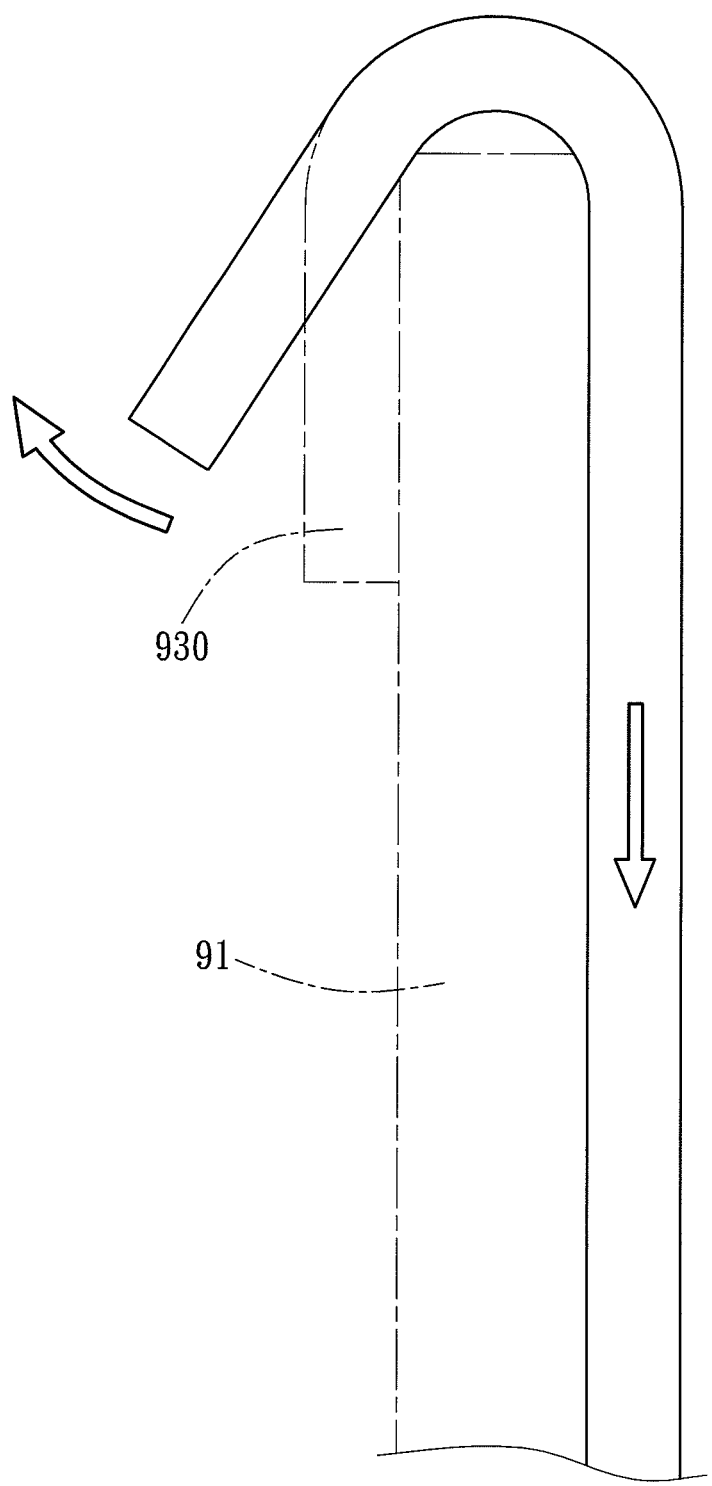
FIG. 9 is a locally enlarged cross-sectional view showing how the eaves of the cover board rests on the top edge of a sideboard or backboard in a conventional tool cabinet.

Of course, the invention still has many other embodiments differing only in details. Please refer to FIG. 5 for a second embodiment of the invention. As shown in in the drawing, a crossbar 22 is provided between two columns 2 on both side of the platform 1 to fix the sideboards 4. The crossbar connects the two columns 2, as shown in FIG. 6, so that the two columns 2 can support each other, further strengthening the stability of the columns 2 and the entire structure of the tool cabinet.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A tool cabinet structure, comprising:
    one platform having a rectangular shape with four right-angled corners;
    four columns standing respectively on the four corners of the platform, the top of each of which has a covering part and a support part, with each of the covering parts bending along the right angle of the corresponding corner and each of the support parts being on the inner side of the platform relative to the corresponding column and adjacent to the corresponding covering part, wherein the covering parts of the four columns are higher than the support parts so that the four covering parts and the four support parts enclose a disposition space at the tops of the four columns;
    one cover board having a rectangular shape with four right-angled corners, the bottom of which rests on the four support parts for the cover board to be accommodated in the disposition space, the four corners of the cover board being blocked by the corresponding covering parts;
    two sideboards respectively standing vertically on two opposite sides of the platform, with both ends thereof fixed to the corresponding columns; and
    one backboard standing vertically on a side of the platform different from the sides of the two sideboards, with both ends thereof fixed to the corresponding columns; and
    wherein the platform, the two sideboards, the backboard, and the cover board enclose an accommodating space, the side opposite to the backboard becomes the opening of the accommodating space; and a plurality of drawers are inserted into the accommodating space in a sliding way.

2. The tool cabinet structure of claim 1, wherein a crossbar is provided between the two columns that fix each of the sideboards on both sides of the platform.

* * * * *